United States Patent
Nguyen et al.

(10) Patent No.: US 7,308,455 B2
(45) Date of Patent: Dec. 11, 2007

(54) SYSTEM AND METHOD FOR DECOMPOSITION OF MULTIPLE ITEMS INTO THE SAME TABLE-COLUMN PAIR WITHOUT DEDICATED MAPPING CONSTRUCTS

(75) Inventors: Dung Kim Nguyen, San Jose, CA (US); Mayank Pradhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 11/021,210

(22) Filed: Dec. 22, 2004

(65) Prior Publication Data
US 2006/0136363 A1 Jun. 22, 2006

(51) Int. Cl.
*G06F 17/30* (2006.01)

(52) U.S. Cl. .................................... 707/101

(58) Field of Classification Search ............. 707/1, 707/2, 10, 200, 101; 717/104
See application file for complete search history.

(56) References Cited

U.S. PATENT DOCUMENTS

| | | | |
|---|---|---|---|
| 5,644,776 A | 7/1997 | DeRose et al. | 395/761 |
| 5,787,449 A | 7/1998 | Vulpe et al. | 707/513 |
| 6,643,633 B2 | 11/2003 | Chau et al. | 707/1 |
| 6,721,727 B2 | 4/2004 | Chau et al. | 707/3 |
| 2004/0030701 A1 | 2/2004 | Vandersluis et al. | 707/10 |

*Primary Examiner*—Etienne LeRoux
(74) *Attorney, Agent, or Firm*—Sandra M. Parker, Esq.

(57) ABSTRACT

A system and computer-based method is provided for decomposing and storing a markup based document into a relational database. For a schema of a markup based document a user identifies multiple items mapping into a same database table-column pair, creates a logical table and associates the logical table to each item and a corresponding database table. Next, a user creates a mapping document of the markup based document with mapping annotations defining mapping of the items into columns of the logical tables. Decomposition of each item into a corresponding logical table column is accomplished by collecting the item content from the markup based document and storing it in the corresponding row column.

18 Claims, 12 Drawing Sheets

```xml
<branches>
<branch>
    <name>Branch1</name>
    <phone>212-123-4567</phone>
    <sub-branch>
        <name>sub-branch11</name>
        <phone>212-123-4568</phone>
        <address1>2555 Wall Street</address1>
        <city>New York</city>
        <state>NY</state>
        <zip>10123</zip>
    </sub-branch>
    <address1>2333 Wall Street</address1>
    <city>New York</city>
    <state>NY</state>
    <zip>10123</zip>
</branch>
<branch>
    <name>Branch2</name>
    <phone>212-123-4789</phone>
    <address1>5555 3rd Avenue</address1>
    <city>New York</city>
    <state>NY</state>
    <zip>10123</zip>
    <other-countries>
    <branch>
        <country>India</country>
        <branchName>Branch3</branchName>
        <phone>91-22-2222-345-7890</phone>
        <address>315 SEEPZ, Andheri</address>
        <city>Mumbai</city>
        <state>Maharashtra</state>
        <zip>400091</zip>
    </branch>
```

FIG. 1A

```xml
<branch>
   <country>India</country>
   <branchName>Branch4</branchName>
   <phone>91-22-2222-345-7892</phone>
   <address>420 SEEPZ, Andheri</address>
   <city>Mumbai</city>
   <state>Maharashtra</state>
   <zip>400091</zip>
</branch>
<branch>
   <country>Canada</country>
   <branchName>Branch5</branchName>
   <phone>01-1-519-345-7890</phone>
   <address>P.O. Box 43072</address>
   <city>Toronto</city>
   <state>Ontario</state>
   <zip>02940-3072</zip>
</branch>
</other-countries>
</branch>
/branches>
```

FIG. 1B

Table Name: branches

| Name | Phone | Address | City | State | Zip | Country |
|---|---|---|---|---|---|---|
| Branch1 | 212-123-4567 | 2333 Wall Street | New York | NY | 10123 | USA |
| sub-branch11 | 212-123-4568 | 2555 Wall Street | New York | NY | 10123 | USA |
| Branch2 | 212-123-4789 | 5555 3rd Avenue | New York | NY | 10123 | USA |
| Branch3 | 91-22-2222-345-7890 | 315 SEEPZ, Andheri | Mumbai | Maharashtra | 400091 | India |
| Branch4 | 91-22-2222-345-7892 | 420 SEEPZ, Andheri | Mumbai | Maharashtra | 400091 | India |
| Branch5 | 01-1-519-345-7890 | P.O. Box 43072 | Toronto | Ontario | 02940-3072 | Canada |

FIG. 2

```
?xml version="1.0"?>
!DOCTYPE DAD SYSTEM "/usr/lpp/db2xml_07_01/dtd/dad.dtd">
DAD>
validation>NO</validation>
Xcollection>
prolog>?xml version="1.0"?</prolog>
root_node>
<element_node name="branches" >
<RDB_node>
  <table name="branches" />
  <table name="USASubBranches" />
  <table name="NonUSABranches"/>
  <condition></condition>
</RDB_node>
<element_node name="branch" multi_occurrence="YES">
  <element_node name="name">
    <text_node>    <RDB_node>
      <table name = "branches" />
      <column name="name" type="varchar(40)"/>
    </RDB_node> </text_node>
  </element_node>
  <element_node name="phone" >
    <text_node>    <RDB_node>
      <table name = "branches" />
      <column name="phone" type="varchar(30)"/>
    </RDB_node> </text_node>
  </element_node>
```

FIG. 3A

```xml
<element_node name="sub-branch" multi_occurrence="YES">
  <element_node name="name">
    <text_node>    <RDB_node>
      <table name = "USASubBranches" />
      <column name="name" type="varchar(40)"/>
    </RDB_node> </text_node>
  </element_node>
  <element_node name="phone" >
    <text_node>    <RDB_node>
      <table name = "USASubBranches" />
      <column name="phone" type="varchar(30)"/>
    </RDB_node> </text_node>
  </element_node>
  <element_node name="address1">
    <text_node>    <RDB_node>
      <table name = "USASubBranches" />
      <column name="address" type="varchar(50)"/>
    </RDB_node> </text_node>
  </element_node>
  <element_node name="city" >
    <text_node>    <RDB_node>
      <table name = "USASubBranches" />
      <column name="city" type="varchar(30)"/>
    </RDB_node> </text_node>
  </element_node>
  <element_node name="zip" >
    <text_node>    <RDB_node>
      <table name = "USASubBranches" />
      <column name="zip" type="varchar(20)"/>
    </RDB_node> </text_node>
  </element_node>
</element_node>   <!-- sub-branches -->
```

FIG. 3B

```xml
<element_node name="address1">
  <text_node>    <RDB_node>
    <table name = "branches" />
    <column name="address" type="varchar(50)"/>
  </RDB_node> </text_node>
</element_node>
<element_node name="city" >
  <text_node>    <RDB_node>
    <table name = "branches" />
    <column name="city" type="varchar(30)"/>
  </RDB_node> </text_node>
</element_node>
<element_node name="zip" >
  <text_node>    <RDB_node>
    <table name = "branches" />
    <column name="zip" type="varchar(20)"/>
  </RDB_node> </text_node>
  </element_node>
</element_node> <!-- branch -->
<element_node name="other-countries">
  <element_node name="branch" multi_occurrence="YES">
    <element_node name="country">
      <text_node> <RDB_node>
        <table name="NonUSABranches"/>
        <column name="country"/>
      </RDB_node> </text_node>
    </element_node>
    <element_node name="branchName">
      <text_node>    <RDB_node>
        <table name = "NonUSABranches" />
        <column name="name" type="varchar(40)"/>
      </RDB_node> </text_node>
    </element_node>
```

FIG. 3C

```
<element_node name="phone" >
  <text_node>    <RDB_node>
    <table name = "NonUSABranches" />
    <column name="phone" type="varchar(30)"/>
  </RDB_node> </text_node>
</element_node>
<element_node name="address">
  <text_node>    <RDB_node>
    <table name = "branches" />
    <column name="address" type="varchar(50)"/>
  </RDB_node> </text_node>
</element_node>
<element_node name="city" >
  <text_node>    <RDB_node>
    <table name = "branches" />
    <column name="city" type="varchar(30)"/>
  </RDB_node> </text_node>
</element_node>
<element_node name="zip" >
  <text_node>    <RDB_node>
    <table name = "branches" />
    <column name="zip" type="varchar(20)"/>
  </RDB_node> </text_node>
</element_node>
</element_node>  <!-- other-countries -->
</element_node>  <!-- branch -->
/element_node> <!-- branches -->
/root_node>
/DAD>
```

FIG. 3D

```xml
<?xml version="1.0" encoding="UTF-8"?>
<xs:schema xmlns:xs="http://www.w3.org/2001/XMLSchema"
     xmlns:db2-xdb="http://www.ibm.com/xmlns/product/db2/xdb1"
     elementFormDefault="qualified" attributeFormDefault="unqualified">
 <xs:element name="branches">
  <xs:complexType>
   <xs:sequence>
    <xs:element name="branch" maxOccurs="unbounded">
     <xs:complexType>
      <xs:sequence>
       <xs:element name="name" type="xs:string"
             db2-xdb:rowSet="branches" db2-xdb:column="name"/>
       <xs:element name="phone" type="xs:string"
                db2-xdb:rowSet="branches"
                db2-xdb:column="phone"/>

<xs:element name="sub-branch" minOccurs="0"
         maxOccurs="unbounded"
         db2-xdb:rowSet="USASubBranches"  db2-xdb:column="country"
         db2-xdb:expression="USA">
        <xs:complexType>
          <xs:sequence>
         <xs:element name="name" type="xs:string"
                db2-xdb:rowSet="USASubBranches"
                db2-xdb:column="name"/>
         <xs:element name="phone" type="xs:string"
                db2-xdb:rowSet="USASubBranches"
                db2-xdb:column="phone"/>
         <xs:element name="address1" type="xs:string"
                db2-xdb:rowSet="USASubBranches"
                db2-xdb:column="address"/>
         <xs:element name="city" type="xs:string"
                db2-xdb:rowSet="USASubBranches"
                db2-xdb:column="city"/>
```

FIG. 4A

```
<xs:element name="state" type="xs:string"
        db2-xdb:rowSet="USASubBranches"
        db2-xdb:column="state"/>
<xs:element name="zip" type="xs:integer"
        db2-xdb:rowSet="USASubBranches"
        db2-xdb:column="zip"/>
  </xs:sequence>
 </xs:complexType>
</xs:element>

<xs:element name="address1" type="xs:string"
        db2-xdb:rowSet="branches"
        db2-xdb:column="address"/>
<xs:element name="city" type="xs:string"
        db2-xdb:rowSet="branches" db2-xdb:column="city"/>
<xs:element name="state" type="xs:string"
        db2-xdb:rowSet="branches" db2-xdb:column="state"/>
<xs:element name="zip" type="xs:integer"
        db2-xdb:rowSet="branches" db2-xdb:column="zip"/>
<xs:element name="other-countries" minOccurs="0" >
 <xs:complexType>
   <xs:sequence>
     <xs:element name="branch" maxOccurs="unbounded">
       <xs:complexType>
        <xs:sequence>
         <xs:element name="country" type="xs:string"
            db2-xdb:rowSet="NonUSABranches"
            db2-xdb:column="country"/>
         <xs:element name="branchName" type="xs:string"
            db2-xdb:rowSet="NonUSABranches"
            db2-xdb:column="name"/>
         <xs:element name="phone" type="xs:string"
             db2-xdb:rowSet="NonUSABranches"
             db2-xdb:column="phone"/>
```

FIG. 4B

```xml
<xs:element name="address" type="xs:string"
    db2-xdb:rowSet="NonUSABranches"
    db2-xdb:column="address"/>
<xs:element name="city" type="xs:string"
    db2-xdb:rowSet="NonUSABranches"
    db2-xdb:column="city"/>
<xs:element name="state" type="xs:string"
    db2-xdb:rowSet="NonUSABranches"
    db2-xdb:column="state"/>
<xs:element name="zip" type="xs:string"
    db2-xdb:rowSet="NonUSABranches"
    db2-xdb:column="zip"/>
       </xs:sequence>
      </xs:complexType>
     </xs:element>  <!-- branch -->
    </xs:sequence>
   </xs:complexType>
  </xs:element> <!-- other-countries -->
   </xs:sequence>
  </xs:complexType>
 </xs:element>  <!-- branch -->
  </xs:sequence>
 </xs:complexType>
</xs:element> <!--branches -->
</xs:schema>
```

FIG. 4C

SYSTEM AND METHOD FOR DECOMPOSITION OF MULTIPLE ITEMS INTO THE SAME TABLE-COLUMN PAIR WITHOUT DEDICATED MAPPING CONSTRUCTS

BACKGROUND OF THE INVENTION

1. Field of the Invention

This invention relates in general to database management systems performed by computers, and in particular to an optimized method and system for decomposing markup based documents, such as XML documents, into a relational database wherein multiple items are decomposed into the same table-column pair without dedicated mapping constructs.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

Extensible Markup language (XML) is a standard data-formatting mechanism used for representing data on the Internet in a hierarchical data format and for information exchange. An XML document consists of nested element structures, starting with a root element.

Decomposition of an XML document is the process of breaking the document into component pieces and storing those pieces in a database. The specification of the pieces and where they are to be stored is accomplished by means of a mapping document. One format of mapping documents is the Document Access Definition (DAD), utilized as one aspect of the DB2 XML Extender v7 and v8, providing decomposition function. Another type of mapping documents is in the form of a set of XML schema documents that describe the structure and data types used in conforming XML instance documents. XML schema documents are augmented with annotations that describe the mapping of XML components into tables/columns in a relational database. Annotations are a feature of XML schema that provide for application-specific information to be supplied to programs processing the schema or instance documents.

At least one conventional decomposition product using the XML schemas is limited because it can only map a single item into a table-column pair. The problem is best described by an example of FIGS. 1A-1B, which illustrates an XML document.

The XML document of FIGS. 1A-1B contains branches of a company. Each branch has a name, phone number and address. Branches in the USA are allowed to have sub-branches under them. This is done by the use of element "sub-branches" as a child element of branches and as the next sibling of the element "phone". In addition, provision is made to accommodate companies that have branches in countries other than the USA, by putting such branches under the element "other-countries".

The aim is to create an address book of all the branches and sub-branches in the company. The desired result of decomposing the above XML document into a table "branches" of a relational database is shown in FIG. 2. It is quite clear from the expected output that items from various parts of the XML document, with same and/or different element names, such as "name", "address", "address1", and "phone", are being mapped into the same table-column pair, although they belong to different branches types, namely, USA branches, USASubBranches or NonUSABranches.

For the XML document of FIGS. 1A-1B care has to be taken, when multiple items are mapped into the same table-column pair, to associate the correct branch with the correct address and phone number as there are multiple names, phone numbers and addresses in the document. However, it is not guaranteed that related name, address and phone number may appear sequentially, as is shown in the case of a branch having sub-branches where the sub-branch address appears before the parent branch's address. Therefore, in conventional systems there is a problem of identifying the items in the XML document that belong to the same row of the database table, as we do not want put the phone number of a branch and the address of its sub-branch in the same row. More generally stated, there is a problem in conventional methods for decomposition of XML documents, where multiple items are being mapped into the same table-column, in identifying the items in the XML document that belong to the same row.

While there have been various techniques developed for decomposing and storing of markup based documents, such as XML documents, in a database, there is a need for a simple, optimized, transparent and generic method which will allow decomposition of multiple information items from an XML document into the same table-column pair, without needing dedicated mapping constructs.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a method for decomposing and storing a markup based document into a relational database. For a schema of a markup based document a user identifies multiple items mapping into a same database table-column pair, creates a logical table and associates the logical table to each item and a corresponding database table. Next, a user creates a mapping document of the markup based document with mapping annotations defining mapping of the items into columns of the logical tables. Decomposition of each item into a corresponding logical table column is accomplished by collecting the item content from the markup based document and storing it in the corresponding row column, for later storage in a database table.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout:

FIGS. 1A-1B illustrate an XML document;

FIG. 2 illustrates a relational database output for the XML document of FIGS. 1A-1B;

FIGS. 3A-3D illustrate use of the Document Access Definition (DAD) mapping document, according to the preferred embodiments of the present invention;

FIGS. 4A-4C illustrate the mapping by using an annotated XML schema, according to the preferred embodiments of the present invention;

DETAILED DESCRIPTION OF THE PREFERRED EMBODIMENTS

Figure 5:
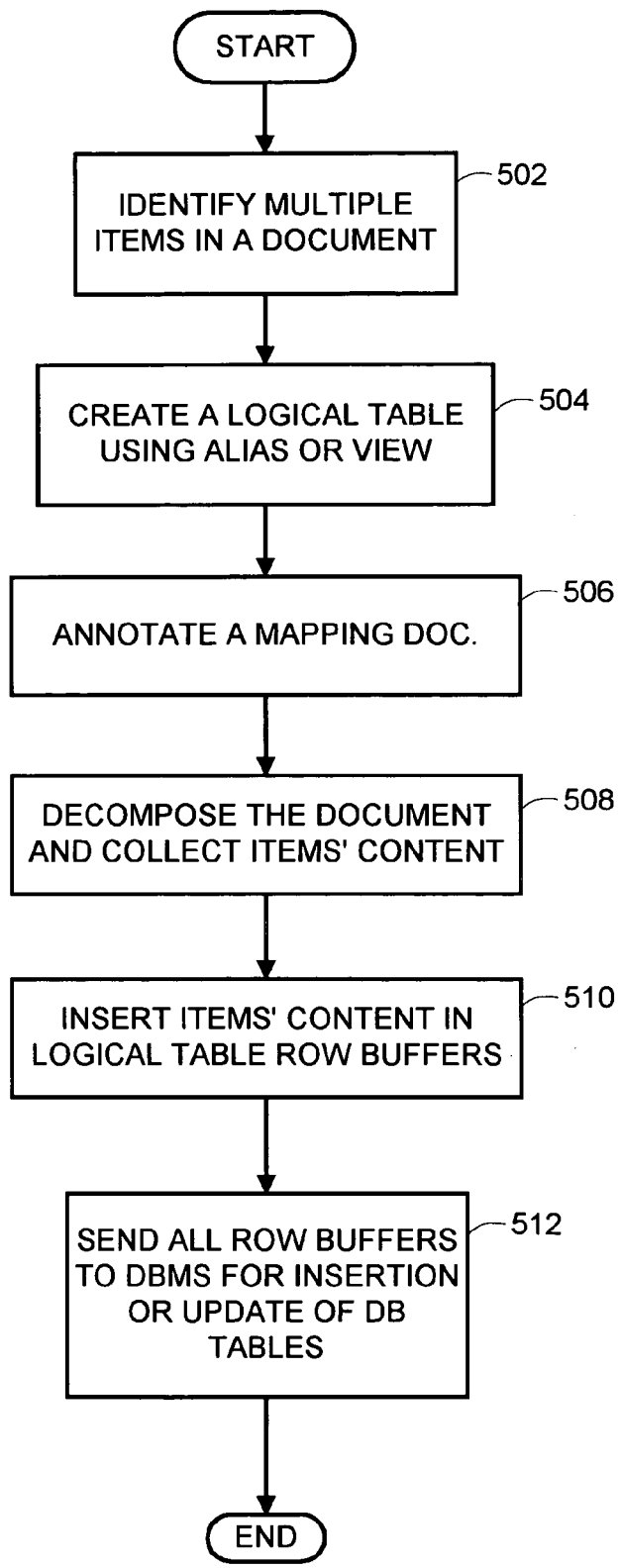
FIG. 5 illustrates a flowchart of the module used for the markup based document decomposition, according to the preferred embodiments of the present invention.

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, method and computer usable medium, tangibly embodying a program of instructions executable by the computer to perform method steps of the present invention, for decomposing and storing of markup based documents, such as Extensible Markup Language (XML) documents, in a relational database, where multiple information items from the XML document are decomposed into the same table-column pair, without needing dedicated mapping constructs. The method and system of the present invention may be used in a distributed computing environment in which two or more computer systems are connected by a network, such as World Wide Web, including environments in which the networked computers are of different type.

The preferred method embodiment of the present invention decomposes the XML documents into database data. The aspects of the present invention utilize functions of the relational database and RDBMS engine. Decomposition of an XML document into database data is preferably carried out by the DB2 XML Extender.

Decomposition of an XML document is the process of breaking the document into component pieces and storing those pieces in a database. The specification of the pieces and where they are to be stored is accomplished by means of a mapping document. Mapping documents can have various formats. One format of mapping documents is the Document Access Definition (DAD) utilized as one aspect of the DB2 XML Extender v7 and v8, providing decomposition function. Another format of mapping documents is a set of XML schema documents that describe the structure of conforming XML instance documents. The XML schemas are augmented with annotations that describe the mapping of XML components to tables/columns in a relational database. Annotations provide application-specific information to programs processing the schema or instance documents.

To enable decomposition of multiple items mapped to the same table and column, when a set of related items in a XML document is to form a row, the mapping document of the present invention identifies those items as being mapped to columns of the same logical table, rather than the actual physical table. A logical table is either a table name alias or a view of the actual base physical table from the database, or it is the actual base physical table itself, if no table view or alias for the same physical table name exists.

Most commercial databases allow users to create aliases on tables. An alias, as the name suggests, is essentially another, logical name for a base physical table. Therefore, an alias is created, as a database object, over the primary target table. To the decomposition algorithm it appears as though different items are being mapped into different table-column pairs. But at the database level, insertion into an alias table automatically results in an insertion into the physical table for which the alias was created. In DB2, a table alias is created with the SQL statement: CREATE ALIAS [alias name] FOR [table name].

The present invention can be implemented by using existing, unmodified decomposition utilities. Thus, it allows any algorithm that can handle decomposition of an element/attribute into a table-column pair to be extended to support mapping of more than one item into the same table-column pair without making any change in the algorithm itself and without need for additional dedicated mapping constructs. Any existing decomposition utility which has the ability to decompose an XML document into multiple tables, also has the ability to shred the document with multiple items destined for the same actual table-column pair, with the aspects of the present invention which use table aliases or views to make a single physical table appear as if it were many different tables. Thus, through the use of aliases and views, the decomposition function is hereby extended to handle the mapping of multiple items into the same table-column pair, without any changes to the decomposition utility implementation or the mapping language. To the decomposition function all the logical tables that correspond to a single base table are distinct but all the data inserted into the different logical tables are actually stored in the same physical table.

FIGS. 3A-3C and FIGS. 4A-4 illustrate the implementation of the preferred aspects of the present invention in two different decomposition utilities. First exemplary implementation, of FIGS. 3A-3C, is shipped in DB2 XML Extender versions v7 & v8, using the format of the Document Access Definition (DAD) mapping document. Second exemplary implementation, of FIGS. 4A-4, does the mapping using an XML annotated schema, as provided in the new decomposition utility to be shipped in DB2 version v9. Both examples produce the rows in the table "branches", shown in FIG. 2, given the same exemplary XML document of FIGS. 1A-1B. For both aspects, the user creates two table views or aliases. Aliases are created as:

CREATE ALIAS USASubBranches FOR branches
CREATE ALIAS NonUSABranches FOR branches Thus, during decomposition the data will be directed to three logical tables, the base table branches, and its two aliases: USASubBranches and NonUSABranches. The same could be accomplished by using views. Next, the user maps XML items to these logical tables, using the table alias names, found in the mapping document. The three logical tables are mapped into the same physical table.

FIGS. 3A-3C illustrate a mapping using the format of the DAD. An DAD element <table> maps a table, specified in its name attribute, to an XML element or attribute, named in the <element_node> or <attribute_node> element that encloses the <table> element. Similarly, an DAD element <column> maps a column, specified in its name attribute to an XML element or attribute named in the <element_node> or <attribute_node> element that encloses the <column> element. This example assumes that the table "branches"

was defined so that the string "USA" is the default value inserted into column "country", if no value is supplied for that column during insertion.

FIGS. 4A-4 illustrate the same mapping using an annotated XML schema, in which the annotation "db2-xdb: rowSet" maps an element/attribute to a logical table. Mapping annotations are indicated by the prefix "db2-xdb", which is associated with the namespace for DB2's decomposition feature [http://]www.ibm.com/xmlns/product/db2/xdb1.

Table views and aliases are managed by the database management system and are completely transparent to the decomposition function, such as that provided by the DB2 XML Extender. The function merely collects a row's worth of data consisting of decomposed XML items, and stores the row into the logical table to which the items were mapped. If the logical table happens to be a table view or alias, the database management system resolves the name of the view or alias to the name of the actual database table. Thus, the data is stored into the actual database table without any changes to the decomposition function or introduction of additional mapping constructs. The simplicity and transparency is an obvious advantage of this method. However, one disadvantage of the present invention is that the database administrator has to keep track of the association between the XML schema and the aliases or views, so that they can be dropped if an XML Schema is not in use anymore.

Flowchart of a computer-based method for decomposing and storing of a markup based document into a relational database, performed according to the preferred embodiments of the present invention, is illustrated in FIG. 5. In step 502 of FIG. 5, the user identifies, from the markup based document, all multiple items mapping into a same database table-column pair. In step 504, user creates a logical table for each multiple item, as needed, using aliases and/or views. In step 506, the user creates a mapping document, corresponding to the markup based document, which defines which table and column will hold the content of a markup based document item. For each base and logical table a set of row buffers is assigned so that each row buffer can hold content for all item columns belonging to a table row.

Step 508 performs decomposition of each markup based document item into a corresponding row buffer column, by calling a decomposition utility and inputting to it the mapping document and the instance markup based document. Decomposition utility parses the markup based document and collects each item's content. It finds the item mapping information in the element/attribute declaration in the mapping document, which includes a logical table and column names. Item content is inserted into the logical table row buffer's column, for later storage in the corresponding database table row. Parsing of the markup based document continues until all items that have mappings are found and placed in corresponding logical table's row buffers' columns, in step 510. At the end of decomposition, in step 512, all row buffers are sent to the DBMS for insertion into or update of the corresponding database tables. DBMS itself figures out which physical table corresponds to the alias or view and inserts the rows accordingly.

Figure 6:
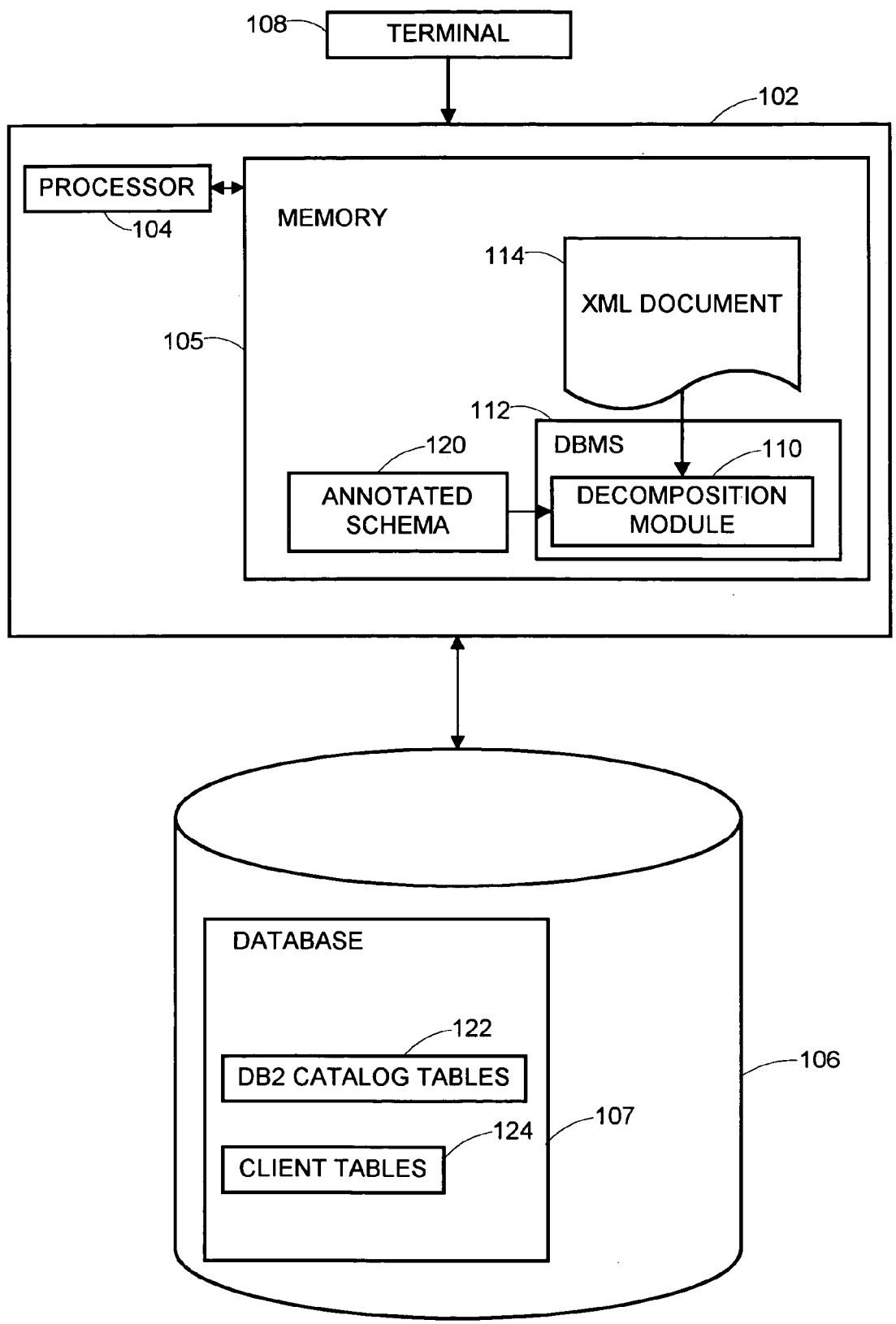
FIG. 6 illustrates a computer hardware and software environment enabling decomposition, according to the preferred embodiments of the present invention.

FIG. 6 illustrates an exemplary computer hardware and software environment usable by the preferred embodiments of the present invention for enabling decomposition. It includes a console 102 having one or more conventional processors 104 executing instructions stored in an associated computer memory 105, and having a console terminal 108.

The memory 105 can be loaded with instructions received through an optional storage drive or through an interface with a computer network.

The processor 104 is connected to one or more electronic storage devices 106, such as disk drives, that store one or more relational databases 107. They may comprise, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiment of the present invention. Alternatively, the program steps can be received into the operating memory from a computer over the network.

Operators of the console terminal 108 use a standard operator terminal interface (not shown), to transmit electrical signals to and from the console 102, that represent commands for performing various tasks, such as search and retrieval functions, termed queries, against the databases 107 stored on the electronic storage device 106. In the present invention, these queries conform to the Structured Query Language (SQL) standard, and invoke functions performed by a DataBase Management System (DBMS) 112, such as a Relational DataBase Management System (RDBMS) software. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries.

FIG. 6 further illustrates a software environment enabling preferred embodiments of the present invention. In the system shown in FIG. 6 the console 102 further includes a decomposition software module 110 of the present invention. The computer-based decomposition software module 110 incorporates a method for transferring data contained in a markup based document, such as an XML document 114, into a relational database 107, stored in the electronic storage device 106. When the DBMS is DB2, relational database 107 has DB2 catalog tables 122 and client tables 124. Decomposition software module 110 is used for decomposing markup based documents, such as XML documents 114, into a relational database client tables 124, wherein multiple items are decomposed into the same table-column pair. For that purpose, decomposition software module 110 uses an annotated XML schema 120, created according to the preferred aspects of the present invention.

Although the description of the preferred embodiments of the present invention was based on XML documents, the present invention is applicable to other types of markup based documents. It is useable by end users of any DBMS products providing XML support, for processing and decomposition of XML documents. It will preferably be used for developing applications for DB2 machines. The present invention works with any of the IBM database manager products, such as DB2 for VM/VSE, DB2 for OS/390, DB2 for AS/400, DB2 Common Server, DB2 Universal Database. However, the technology may be applied to any other database manager product that provide table aliases or views, such as Oracle, Informix, Sybase, SQL Anywhere, and Microsoft SQL Server, and other relational products.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method for decomposing and storing a markup based document into a set of relational database tables comprising:
    (a) identifying multiple items, for a schema of a markup based document, mapping into a same database table-column pair;
    (b) for each said multiple item creating a logical table and associating the logical table to said item and a corresponding database table;
    (c) creating a mapping document of the markup based document with mapping annotations defining mapping of the items into columns of the logical tables; and
    (d) decomposing each said item into a corresponding logical table column.

2. The method according to claim 1, wherein the logical table being created as an alias or view and having a set of row buffers having columns belonging to the database table row, and the step of decomposing each said item into the corresponding logical table column comprises collecting the item content from the markup based document and storing the content in the corresponding row buffer column.

3. The method according to claim 2, further comprising a step of sending all the row buffers to the DBMS for storage in the corresponding database table.

4. The method according to claim 1, wherein the mapping annotations comprising a name of each said logical table and describing mapping between each said item and a corresponding table-column pair.

5. The method according to claim 1, wherein the markup based document being an Extensible Markup Language (XML) document and the mapping document being an annotated XML Schema.

6. The method according to claim 1, wherein the markup based document being an Extensible Markup Language (XML) document and the mapping document being an Document Access Definition document.

7. A computer-based system for decomposing and storing a markup based document into a set of relational database tables, comprising means for:
    (a) identifying multiple items, for a schema of a markup based document, mapping into a same database table-column pair;
    (b) for each said multiple item creating a logical table and associating the logical table to said item and a corresponding database table;
    (c) creating a mapping document of the markup based document with mapping annotations defining mapping of the items into columns of the logical tables; and
    (d) decomposing each said item into a corresponding logical table column.

8. The system according to claim 7, wherein the logical table being created as an alias or view and having a set of row butters having columns belonging to the database table row, and the means for decomposing each said item into the corresponding logical table column comprises means for collecting the item content from the markup based document and storing the content in the corresponding row buffer column.

9. The system according to claim 8, further comprising a step of sending all the row buffers to the DBMS for storage in the corresponding database table.

10. The system according to claim 7, wherein the mapping annotations comprising a name of each said logical table and describing mapping between each said item and a corresponding table-column pair.

11. The system according to claim 7, wherein the markup based document being an Extensible Markup Language (XML) document and the mapping document being an annotated XML Schema.

12. The system according to claim 7, wherein the markup based document being an Extensible Markup Language (XML) document and the mapping document being an Document Access Definition document.

13. A computer usable medium tangibly embodying a program of instructions executable by the computer to perform a computer-based method for decomposing and storing a markup based document into a set of relational database tables, comprising:
    (a) identifying multiple items, for a schema of a markup based document, mapping into a same database table-column pair;
    (b) for each said multiple item creating a logical table and associating the logical table to said item and a corresponding database table;
    (c) creating a mapping document of the markup based document with mapping annotations defining mapping of the items into columns of the logical tables; and
    (d) decomposing each said item into a corresponding logical table column.

14. The method according to claim 13, wherein the logical table being created as an alias or view and having a set of row buffers having columns belonging to the database table row, and the step of decomposing each said item into the corresponding logical table column comprises collecting the item content from the markup based document and storing the content in the corresponding row buffer column.

15. The method according to claim 14, further comprising a step of sending all the row buffers to the DBMS for storage in the corresponding database table.

16. The method according to claim 13, wherein the mapping annotations comprising a name of each said logical table and describing mapping between each said item and a corresponding table-column pair.

17. The method according to claim 13, wherein the markup based document being an Extensible Markup Language (XML) document and the mapping document being an annotated XML Schema.

18. The method according to claim 13, wherein the markup based document being an Extensible Markup Language (XML) document and the mapping document being an Document Access Definition document.

* * * * *